(12) United States Patent
Kohara et al.

(10) Patent No.: US 8,188,016 B2
(45) Date of Patent: May 29, 2012

(54) LUBRICANT COMPOSITION AND BEARING USING SAME

(75) Inventors: Mika Kohara, Kuwana (JP); Takayuki Kawamura, Kuwana (JP); Kenji Tamada, Kuwana (JP)

(73) Assignee: NTN Corporation, Osaka (JP)

( * ) Notice: Subject to any disclaimer, the term of this patent is extended or adjusted under 35 U.S.C. 154(b) by 1237 days.

(21) Appl. No.: 10/885,453

(22) Filed: Jul. 6, 2004

(65) Prior Publication Data

US 2005/0009713 A1     Jan. 13, 2005

(30) Foreign Application Priority Data

Jul. 8, 2003  (JP) ................ P2003-193865
Oct. 3, 2003  (JP) ................ P2003-345581
Oct. 3, 2003  (JP) ................ P2003-345582
Apr. 23, 2004 (JP) ................ P2004-128899
May 12, 2004 (JP) ................ P2004-141983

(51) Int. Cl.
*C10M 169/04* (2006.01)
*C10M 129/36* (2006.01)

(52) U.S. Cl. ........................ 508/154; 508/381

(58) Field of Classification Search .............. 508/181, 508/364, 371, 390, 500, 552, 154, 381; 210/502.1, 210/506

See application file for complete search history.

(56) References Cited

U.S. PATENT DOCUMENTS 3,125,529 A * 3/1964 Simmons et al. ............ 508/433
3,140,997 A * 7/1964 Price ........................... 508/169
3,223,625 A * 12/1965 Neblett et. al. .............. 508/165
3,850,823 A * 11/1974 Kjonaas ....................... 508/170
3,954,638 A * 5/1976 Jones et al. .................. 508/251
4,022,700 A * 5/1977 Harris .......................... 508/184
4,297,227 A * 10/1981 Witte et al. .................. 508/158
4,313,837 A * 2/1982 Vukasovich et al. ........ 508/170
4,465,604 A * 8/1984 King ............................ 508/170
4,639,323 A * 1/1987 Liao ............................. 508/162

(Continued)

FOREIGN PATENT DOCUMENTS

DE      1 261 975      2/1968

(Continued)

OTHER PUBLICATIONS

EPO Search Report.

(Continued)

*Primary Examiner* — Walter D Griffin
*Assistant Examiner* — Taiwo Oladapo
(74) *Attorney, Agent, or Firm* — Hedman & Costigan, P.C.; James V. Costigan

(57) ABSTRACT

A lubricant composition capable of preventing a rolling surface of a bearing from flaking owing to hydrogen embrittlement. The bearing is lubricated with the lubricant composition which is a lubricating oil or grease. The lubricant composition contains a molybdate and an organic acid salt. At least one molybdate is selected from sodium molybdate, potassium molybdate, and lithium molybdate. The organic acid salt is a sodium salt of an organic acid having one to 20 carbon atoms. The lubricant composition forms a film containing a molybdenum compound in addition to an iron oxide film on a worn surface of the bearing or on a fresh surface of an iron-based metal generated by wear. The bearing is used as a rolling bearing for use in electric parts and auxiliary machines of a vehicle. The bearing is also used as a bearing, for a motor, in which the lubricant composition is sealed.

8 Claims, 6 Drawing Sheets

U.S. PATENT DOCUMENTS

| | | | | |
|---|---|---|---|---|
| 4,797,229 | A * | 1/1989 | Frentrup et al. | 508/165 |
| 4,889,646 | A * | 12/1989 | Vettel | 508/316 |
| 5,445,748 | A * | 8/1995 | Holinski | 508/129 |
| 5,910,470 | A * | 6/1999 | Minami et al. | 508/468 |
| 6,008,165 | A * | 12/1999 | Shanklin et al. | 508/185 |
| 6,172,012 | B1 * | 1/2001 | Kumar et al. | 508/165 |
| 6,329,327 | B1 | 12/2001 | Tanaka et al. | |
| 6,455,476 | B1 | 9/2002 | Imai et al. | |
| 6,797,677 | B2 * | 9/2004 | Esche et al. | 508/167 |
| 6,821,932 | B2 * | 11/2004 | Guinther et al. | 508/110 |
| 2002/0082175 | A1 | 6/2002 | Iso et al. | |
| 2004/0180798 | A1 * | 9/2004 | Hartley et al. | 508/476 |

FOREIGN PATENT DOCUMENTS

| | | |
|---|---|---|
| GB | 1 244 934 | 9/1971 |
| JP | 09-217752 | 8/1987 |
| JP | 63-502254 A | 1/1988 |
| JP | 03-210394 | 9/1991 |
| JP | 03-310394 | 9/1991 |
| JP | 04-227690 A | 8/1992 |
| JP | 05-009488 A | 1/1993 |
| JP | 05-026244 | 2/1993 |
| JP | 06-43349 | 6/1994 |
| JP | 06-200273 | 7/1994 |
| JP | 10-121083 | 5/1998 |
| JP | 10-330953 | 12/1998 |
| JP | 11-061168 A | 3/1999 |
| JP | 11-279578 A | 10/1999 |
| JP | 2000-053989 A | 2/2000 |
| JP | 2000053989 A * | 2/2000 |
| JP | 2000-129283 | 5/2000 |
| JP | 11-001693 | 1/2001 |
| JP | 2001-003070 | 1/2001 |
| JP | 2001-065578 | 3/2001 |
| JP | 2001-164281 | 6/2001 |
| JP | 2002-527619 | 8/2002 |
| JP | 2003-013973 | 1/2003 |
| JP | 2003-105366 | 4/2003 |
| JP | 2003-106338 | 4/2003 |
| JP | 2004-124035 | 4/2004 |
| JP | 2005-029622 | 2/2005 |
| JP | 2005-112902 | 4/2005 |
| WO | WO 87/03613 | 6/1987 |

OTHER PUBLICATIONS

Bezborod'Ko, M D, et al "Improvement of Antiwear Properties of Greases" Jul. 1972 "Chem Technol Fuels Oils" Jul.-Aug. 1972, vol. 8 NR. 7-8, pp. 617-619.

* cited by examiner (a)

(b)

LUBRICANT COMPOSITION AND BEARING USING SAME

BACKGROUND OF THE INVENTION

The present invention relates to a lubricant composition used as lubricating oil or grease and a bearing lubricated with the lubricant composition. More particularly, the present invention relates to the lubricant composition capable of preventing a flaking phenomenon from occurring in an early stage with a rolling surface of the bearing turning into white in its texture. The present invention also relates to the bearing lubricated with the lubricant composition.

A bearing lubricated with gear oil or hydraulic oil is used in a hydraulic motor, a hydraulic pump, an axle planetary gear part. As the oil, mineral oil and water-glycol hydraulic oil are used.

In recent years, because the use condition of the bearing lubricated with the gear oil and the hydraulic oil has become severe. For example, the bearing is rotated at a high speed and a high load is applied thereto. Consequently the flaking phenomenon occurs in an early stage with the rolling surface of the bearing turning into white in its texture. The present invention also relates to the bearing lubricated with the lubricant composition.

Unlike flaking which occurs in the interior of the rolling surface owing to metal fatigue, the flaking phenomenon that occurs in an early stage in the rolling surface at a comparatively shallow portion thereof with the rolling surface of the bearing turning into white in its texture. That is, the flaking phenomenon is a hydrogen embrittlement-caused destruction phenomenon. The hydrogen causing the flaking to occur is generated by decomposition of lubricant oil. The hydrogen is generated from the lubricating oil for the following two reasons: (1) decomposition owing to heat and shear generated on the rolling surface and (2) decomposition reaction which takes place with a metal surface generated by wear acting as a catalyst. The generated hydrogen penetrates into bearing steel easily, thus causing the flaking to occur owing to the hydrogen embrittlement. Which of (1) and (2) affects the generation of the hydrogen to a higher extent depends on a use condition of the bearing. When the generation of the hydrogen is caused mainly by (2), reducing the time period in which the fresh metal surface generated by wear is exposed is effective for restraining the generation of the hydrogen. That is, adding an oxidizing agent or the like which makes the generated fresh metal surface inactive immediately to the lubricating oil is effective for restraining the generation of the hydrogen.

Based on the above-described knowledge, the following measures for preventing the rolling surface from flaking owing to the hydrogen embrittlement are proposed: As an example, an oxide film is formed on the rolling surface by using iron oxide black treating method (disclosed in Japanese Utility Model Application Laid-Open No. 6-43349). As another example, a passivating agent is added to grease to form an oxide film on a wear-caused surface generated on the rolling surface (disclosed in Japanese Patent Application Laid-Open No. 3-210394). As still another example, Cr is contained in the material of the bearing ring to form an oxide film on the rolling surface to prevent flaking (U.S. Pat. No. 3,009,254) from occurring.

However, in the oxide film disclosed in Japanese Utility Model Application Laid-Open No. 6-43349, it is necessary to immerse the bearing ring in a water solution of caustic soda heated to a low temperature (130 to 160° C.) to form an iron oxide black ($Fe_3O_4$) on the rolling surface of the bearing in advance. Thus the manufacturing process is complicated. Each of the above-described conventional arts has a disadvantage that the oxide film formed on the rolling surface may flake therefrom owing to a frictional wear between the oxide film and the rolling element. Thus satisfactory measures have not been taken so far.

As disclosed in Japanese Patent Application Laid-Open No. 3-210394, the oxide film is formed on the bearing ring of the bearing. As also disclosed in U.S. Pat. No. 3,009,254, the grease for lubricating the bearing contained the substance for accelerating oxidation of the rolling surface. However, the effective formulation is not clear on the measure for the flaking devised by giving attention to the lubricating oil for use in the bearing. Thus the measures have been hardly used so far.

Year by year, electric parts and auxiliary machines of a vehicle and motors of industrial machines are demanded to be compact and have a high performance and output. Hence the use conditions thereof have become severe. For example, in electric parts and auxiliary machines used in an engine room, reduction of output caused by compactness is compensated by rotating them at high speeds. A rolling bearing is used for them. Grease is mainly used to lubricate them. However, because the use conditions have become severe, the rolling surface of a rolling bearing flakes in an early stage with the rolling surface of the bearing turning into white in its texture. This is a problem to be solved.

SUMMARY OF THE INVENTION

It is an object of the present invention to provide a lubricant composition capable of effectively preventing a rolling surface of a bearing from flaking owing to hydrogen embrittlement. The lubricant composition is used as lubricating oil and grease.

It is another object of the present invention to provide a bearing having a high durability by preventing the rolling surface thereof from flaking. To prevent the rolling surface thereof from flaking, the bearing is lubricated with the lubricant composition. Particularly, the present invention is intended to provide a rolling bearing for electric parts and auxiliary machines of a vehicle and a bearing, for a motor, in which the lubricant composition is sealed.

The lubricant composition of the first invention is used for a bearing. The lubricant composition is used as lubricant oil or grease. The lubricant composition contains molybdate.

The molybdate is a metal salt of a molybdic acid. It is preferable that the molybdate is an alkali metal salt of a molybdic acid. As preferable molybdate of the alkali metal, sodium molybdate, potassium molybdate, and lithium molybdate are available. The lubricant composition also contains an organic acid salt in addition to the molybdate.

The lubricant composition of the second invention is used for a bearing. The lubricant composition contains a permanganate.

The lubricant composition of the third invention is used for a bearing. The lubricant composition is capable of restraining a rolling surface of the bearing from flaking in an early stage and contains a molybdate capable of forming a film containing a molybdenum compound in addition to an iron oxide film on a worn surface of the bearing or on a fresh surface of an iron-based metal generated by wear.

The fourth invention provides a rolling bearing which is lubricated with the above lubricant composition and has a high durability.

It is possible to effectively prevent the rolling surface of the rolling bearing from flaking in an early stage by lubricating the rolling bearing with oil or grease containing the molybdate. Particularly, this effect can be improved by using the molybdate in combination with the organic acid salt. Therefore, the rolling bearing of the present invention is durable.

DETAILED DESCRIPTION OF THE PREFERRED EMBODIMENTS

Figure 1:
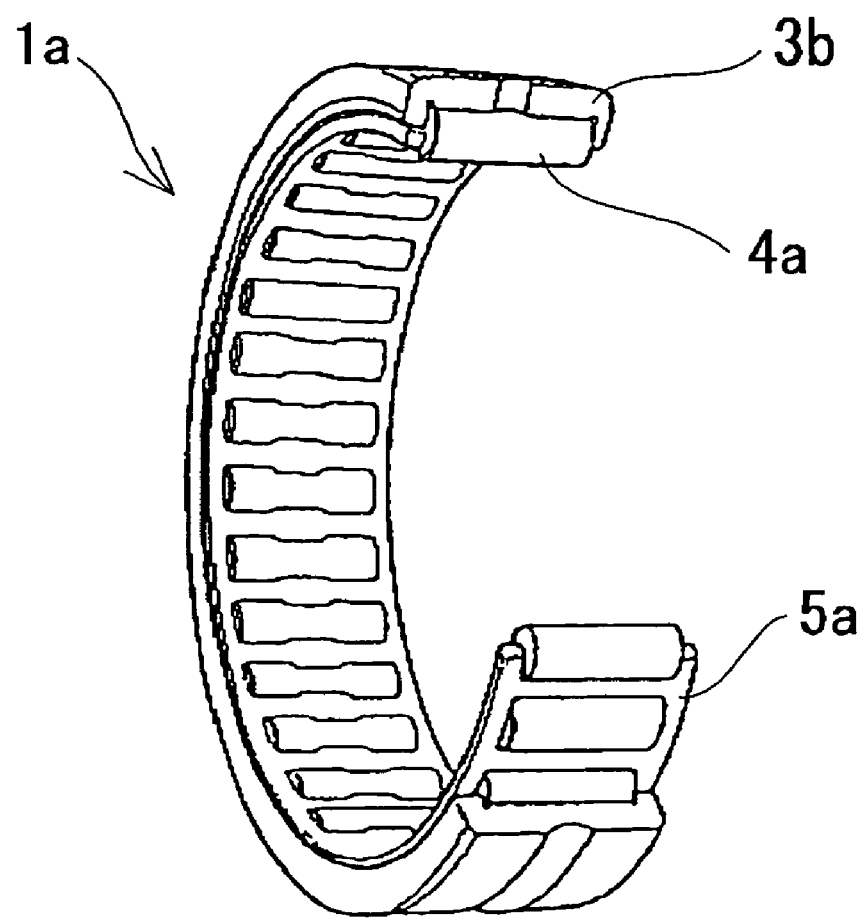
FIG. 1 is a perspective view showing a needle roller bearing.

The present inventors have found that a molybdate added to a lubricant composition for use in a bearing has decomposition and reaction on a worn surface of the bearing or on a fresh surface of an iron-based metal generated by wear to form a film containing a molybdenum compound in addition to an iron oxide film on a rolling surface of the bearing. The film formed in this manner prevents penetration of hydrogen generated owing to decomposition of the lubricant composition into bearing steel, thus restraining the generation of the flaking. The present invention has been made on the basis of this finding.

As a result of a surface analysis made by the present inventors, it has been also found that the use of the molybdate in combination with the organic acid salt makes the thickness of the generated iron oxide film and molybdenum compound film larger than the thickness thereof obtained by the use of only the molybdate and makes the content of the molybdenum larger than the content thereof obtained by the use of only the molybdate. Therefore the organic acid salt has an action of accelerating the generation of the iron oxide film and the molybdenum compound film on the rolling surface of the bearing. The iron oxide film and the molybdenum compound film generated on the rolling surface of the bearing restrains a catalytic action of the generated fresh surface of the iron-based metal, thereby restraining hydrogen from being generated owing to the decomposition of the lubricant composition. Thereby peculiar flaking caused by hydrogen embrittlement can be prevented.

It is preferable that the molybdate that can be used in the present invention is a metal salt. As metals constituting the metal salt, sodium, potassium, lithium, magnesium, calcium, copper, zinc, and barium are available.

Alkali metals such as sodium, potassium, and lithium make reaction on a worn surface of the bearing or on a fresh surface of an iron-based metal generated by wear to readily form the film containing the molybdenum compound in addition to the iron oxide film on the rolling surface thereof. Therefore in the present invention, it is preferable that the molybdate is an alkali metal salt of a molybdic acid. As preferable molybdate of the alkali metal, lithium molybdate, sodium molybdate, and potassium molybdate are available. These molybdates can be used singly or as a mixture.

As the organic acid salt that can be used for the lubricant composition of the present invention, salts of aromatic organic acids, aliphatic organic acids, and alicyclic organic acids can be used. As the organic acid, monobasic organic acids and polybasic organic acids can be used. Of these organic acids, the organic acid having a carboxylic residue having 1 to 20 carbon atoms is preferable because it accelerates the generation of the film containing the molybdenum compound.

It is possible to use the following organic acids: monovalent saturated aliphatic acid such as formic acid, acetic acid, propionic acid, butyric acid, valeric acid, caproic acid, heptanoic acid, caprilic acid, pelargonic acid, capric acid, undecylic acid, lauric acid, tridecyl acid, myristic acid, pentadecyl acid, palmitic acid, margaric acid, stearic acid, nonadecyl acid, and arachic acid; monovalent unsaturated aliphatic acid such as acrylic acid, crotonic acid, undecylenic acid, oleic acid, gadleic acid; bivalent saturated aliphatic acid such as malonic acid, methylmalonic acid, succinic acid, methylsuccinic acid, dimethylmalonic acid, ethylmalonic acid, glutaric acid, adipic acid, dimethylsuccinic acid, pimelic acid, tetramethylsuccinic acid, suberic acid, azelaic acid, sebacic acid, brassylic acid; bivalent unsaturated aliphatic acid such as fumaric acid, maleic acid, oleic acid; derivatives of aliphatic acid such as tartaric acid and citric acid: and aromatic organic acid such as benzoic acid, phthalic acid, trimellitic acid, and pyromellitic acid.

It is preferable that the organic acid salt is the metal salt. Of the metal salts, sodium salts are preferable. As preferable metal salts of the organic acid, sodium benzoate, monosodium sebacate, disodium sebacate, monosodium succinate, and disodium succinate are available.

When only the molybdate is added to the lubricant composition of the present invention, 0.01 to 10 wt % of the molybdate and preferably 0.05 to 3 wt % thereof is added to the lubricant composition. If the addition amount of the molybdate is less than 0.01 wt %, it is impossible to restrain the rolling surface from flaking owing to the hydrogen embrittlement. On the other hand, if the addition amount of the molybdate exceeds 10 wt %, there is no increase in the flaking-restraining effect. Further the manufacturing cost becomes high. In addition, the bearing is defectively lubricated. Thus fatigue flaking is liable to occur from the surface of the bearing.

It is preferable that 0.01 to 5 wt % of the molybdate is added to the entire lubricant composition and that 5 to 70 wt % of the organic acid salt is added to the above-described addition amount of the molybdate. If the addition amount of the molybdate and that of the organic acid salt are less than 0.01 wt % and 5 wt % respectively, it is impossible to prevent the rolling surface from flaking owing to the hydrogen embrittlement. If the addition amount of each of the molybdate and the organic acid salt is more than 5 wt % and 70 wt % respectively, there is no increase in the flaking-preventing effect.

When the lubricant composition contains a permanganate, an oxide film inactive and not having a catalytic action is formed on a worn rolling surface of the bearing or on the fresh metal surface, generated on the rolling surface by wear. The oxide film formed on the rolling surface of the bearing restrains hydrogen from being generated owing to decomposition of the lubricant composition caused by the catalytic action of the fresh metal surface generated on the rolling surface, thus preventing the generation of the peculiar flaking caused by the hydrogen embrittlement.

As the permanganate that can be used in the present invention, sodium permanganate, potassium permanganate, lithium permanganate, magnesium permanganate, calcium permanganate, copper permanganate, zinc permanganate, and barium permanganate are available. Of these permanganates, potassium permanganate is most favorable because it is readily and industrially available.

When the permanganate is used instead of the molybdate or the organic acid salt, it is preferable to add 0.01 to 5 wt % of the permanganate to the entire lubricant composition. If the addition amount of the permanganate is less than 0.01 wt %, it is impossible to restrain the rolling surface from flaking owing to the hydrogen embrittlement. On the other hand, if the addition amount of the molybdate exceeds 5 wt %, there is no increase in the flaking-restraining effect. Further the bearing is defectively lubricated. Thus fatigue flaking is liable to occur from the surface of the bearing in an early stage.

When the lubricant composition of the present invention is used as lubricating oil, both water-based lubricating oil and non-water-based lubricating oil can be used as the base oil of the lubricating oil. It is possible to use general-purpose lubricating oil as the base oil thereof. More specifically, as the base oil of the lubricating oil, it is possible to use mineral oil such as spindle oil, refrigerator oil, turbine oil, machine oil, dynamo oil; hydrocarbon synthetic oil such as highly refined mineral oil, liquid paraffin, GTL base oil synthesized by Fischer-Tropsh method, polybutene, poly-α-olefin, alkylnaphthalene, aromatic compounds; non-hydrocarbon synthetic oil such as natural fats and oils, polyol ester oil, phosphate oil, polymer ester oil, aromatic ester oil, carbonate, diester oil, polyglycol oil, silicone oil, polyphenyl ether oil, alkyldiphenyl ether oil, alkylbenzene oil, fluorinated oil; and water-based lubricating oil such as water-glycol hydraulic oil.

In the case where a low friction is demanded, a preferable result can be obtained by using ester oil, silicone oil, and the like.

The molybdate is water-soluble. Thus by adding the molybdate to the water-based lubricating oil with which the molybdate can be uniformly mixed, it is possible to display the effect of restraining the flaking owing to the hydrogen embrittlement.

When the non-water-based lubricating oil is used as the base oil of the lubricating oil, it is preferable to pulverize the molybdate in advance or add a dispersant to the non-water-based lubricating oil.

When the permanganate is used instead of the molybdate, the permanganate is treated as in the case of the molybdate.

When the lubricant composition is used as the lubricant oil, it is possible to add the following known additives to the lubricant composition as necessary, provided that the additives are used in a range in which they do not prevent the film containing the molybdenum compound from being formed on the generated fresh surface, of the iron-based metal by wear: antioxidant, corrosion inhibitor, oiliness agent, viscosity index improver, pour point depressant, antifoamer, emulsifying agent, metal deactivator, and detergent-dispersant.

When the water-based lubricating oil is used, it is preferable to add a proper amount of the corrosion inhibitor thereto to prevent rust from being generated on bearing steel. The following corrosion inhibitors are available: carboxylic acid, carboxylate, sulfonate, amine, alkenylsuccinic acid, and partially esterified alkenylsuccinic acid. When the permanganate is used instead of the molybdate, the permanganate is treated as in the case of the molybdate.

When the lubricant composition of the present invention is used as grease, as the base oil of the grease, it is possible to use mineral oil such as spindle oil, refrigerator oil, turbine oil, machine oil, dynamo oil; hydrocarbon synthetic oil such as highly refined mineral oil, liquid paraffin, GTL base oil synthesized by Fischer-Tropsh method, polybutene, poly-α-olefin, alkylnaphthalene, aromatic compounds; and non-hydrocarbon synthetic oil such as natural fats and oils, polyol ester oil, phosphate oil, polymer ester oil, aromatic ester oil, carbonate, diester oil, polyglycol oil, silicone oil, polyphenyl ether oil, alkyldiphenyl ether oil, alkylbenzene oil, fluorinated oil; and water-based lubricating oil such as water-glycol hydraulic oil.

As the thickner for the grease, it is possible to use soaps such as Penton, silica gel, fluorine compounds, lithium soap, lithium complex soap, calcium soap, calcium complex soap, aluminum soap, aluminum complex soap; and urea compounds such as diurea compounds, polyurea compounds, and the like. The urea compound is desirable in consideration of heat resistance and cost.

As the urea compound, the diurea compound and the polyurea compound are available. The diurea compound is obtained by reaction between diisocyanate and monoamine. As the diisocyanate, the following diisocyanates are available: phenylene diisocyanate, tolylene diisocyanate, diphenyl diisocyanate, diphenylmethane diisocyanate, octadecane diisocyanate, decane diisocyanate, and hexane diisocyanate. As the monoamine, the following monoamines are available: octyl amine, dodecylamine, hexadecylamine, stearylamine, oleylamine, aniline, p-toruizine, and cyclohexylamine. The polyurea is obtained by reaction between the diisocyanate, monoamine and diamine. As the diisocyanate and the monoamine, substances similar to those used to form the diurea compound. As the diamine, ethylenediamine, propanediamine, butanediamine, hexanediamine, octanediamine, phenylenediamine, tolylenediamine, xylenediamine, and diaminodiphenylmethane are available.

The urea compound is obtained by reaction between an isocyanate compound and an amine compound. To prevent a reactive free radical from being left, it is preferable to use the isocyanate compound and the amine compound in such a way that the isocyanate group of the isocyanate compound and the amino group of the amine compound are almost equal to each other in the equivalent weight thereof.

Base grease to which various compounding ingredients are added is obtained by adding the urea compound to base oil. The base grease is formed by reaction between the isocyanate compound and the amine compound in the base oil.

The thickner is added to the entire base grease at 1 to 40 wt % and preferably 3 to 25 wt %. If the content of the thickner is less than 1 wt %, the thickner has a low degree of thickening effect, and greasing is difficult. If the content of the thickner is more than 40 wt %, the obtained grease is so hard that it is difficult to obtain a desired effect.

As additives that can be added to the grease, it is possible to use an antioxidant such as an organic zinc compound, antioxidants containing amine, phenol, and sulfur; a metal deactivator such as benzotriazole; a viscosity index improver such as polymethacrylate and polystyrene; a solid lubricant such as molybdenum disulfide and graphite; a corrosion inhibitor such as metal sulfonate and polyvalent alcohol ester; a friction modifier such as organic molybdenum; an oiliness agent such as ester and alcohol; and a phosphorous-containing anti-wear agent. These additives can be added to the grease singly or in combination.

The lubricant composition of the present invention to be used as lubricating oil and grease is capable of restraining the peculiar flaking caused by the hydrogen embrittlement. Therefore it is possible to prolong the life of the bearing lubricated with the lubricant composition. Thus the lubricant composition of the present invention can be used for a ball bearing, a cylindrical roller bearing, a tapered roller bearing, a self-aligning roller bearing, a needle roller bearing, a cylindrical roller thrust bearing, a tapered roller thrust bearing, a needle roller thrust bearing, and a self-aligning roller thrust bearing.

FIG. 1 shows an example of a rolling bearing lubricated with the lubricating oil of the present invention. FIG. 1 is a perspective view showing an example of a shell type needle roller bearing.

A needle roller bearing 1a includes an outer ring 3b formed from a steel plate by means of precision deep-drawing processing or the like and a roller 4a provided with a holder 5a incorporated in the outer ring 3b. The needle roller bearing 1a allows a shaft to serve directly as a raceway surface and is frequently lubricated with lubricating oil.

Figure 2:
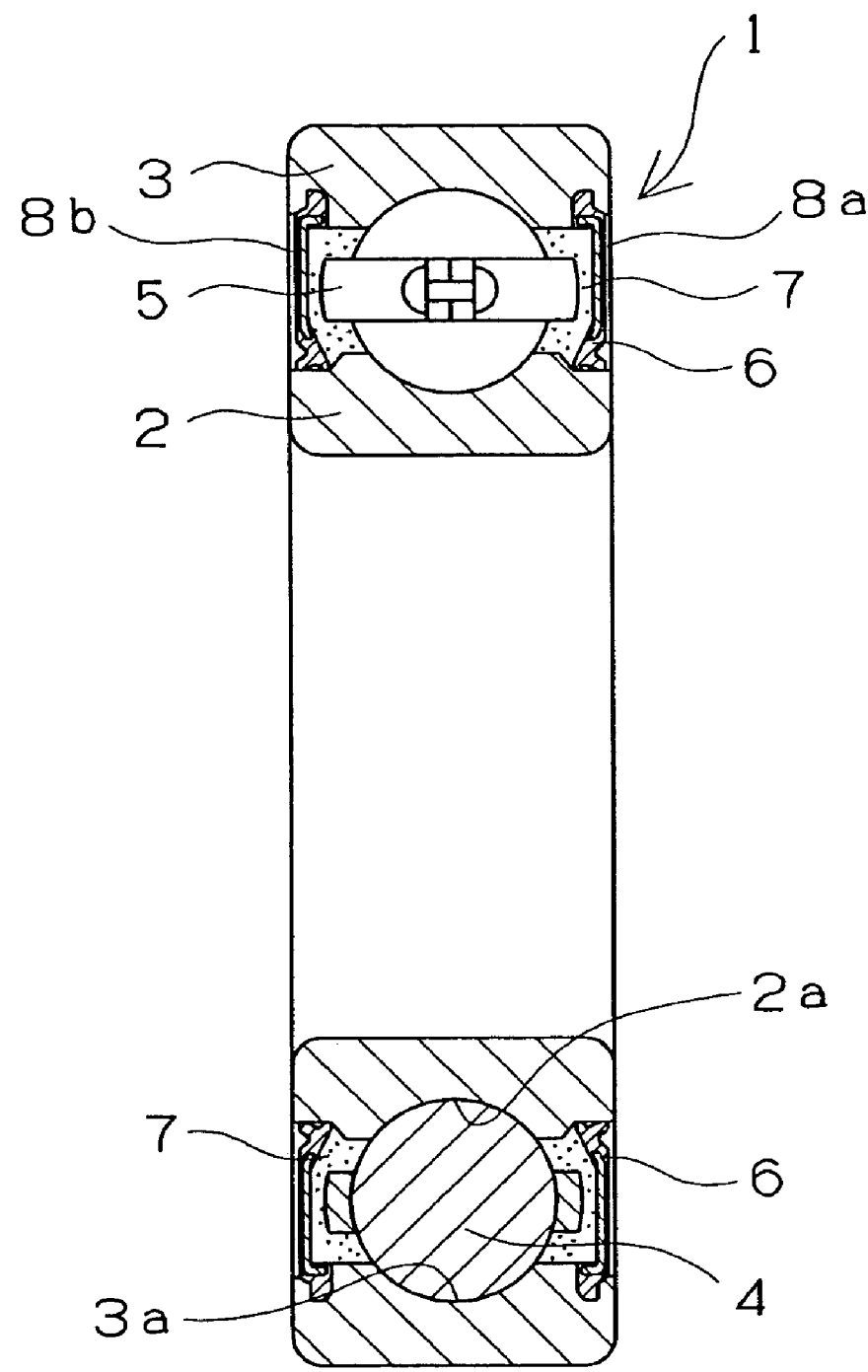
FIG. 2 is a sectional view showing a deep groove ball bearing.

FIG. 2 shows an example of a rolling bearing, lubricated with the grease of the present invention, which is used for electric parts and auxiliary machines of a vehicle to rotatably support a rotational shaft driven by an output of an engine on a stationary member.

A grease-sealed bearing 1 includes an inner ring 2 having an inner ring rolling surface 2a on its peripheral surface, an outer ring 3 concentric with the inner ring 2 and having an outer ring rolling surface 3a on its inner peripheral surface, and a plurality of rollers 4 disposed between the inner ring rolling surface 2a and the outer ring rolling surface 3a. A holder 5 holding the rollers 4 and a sealing member 6 fixed to the outer ring 3 are provided at openings 8a and 8b of the inner ring 2 and the outer ring 3 respectively. The openings 8a and 8b are disposed at axial end of the inner ring 2 and the outer ring 3 respectively. A grease 7 is essentially applied to the periphery of each roller 4.

Figure 3:
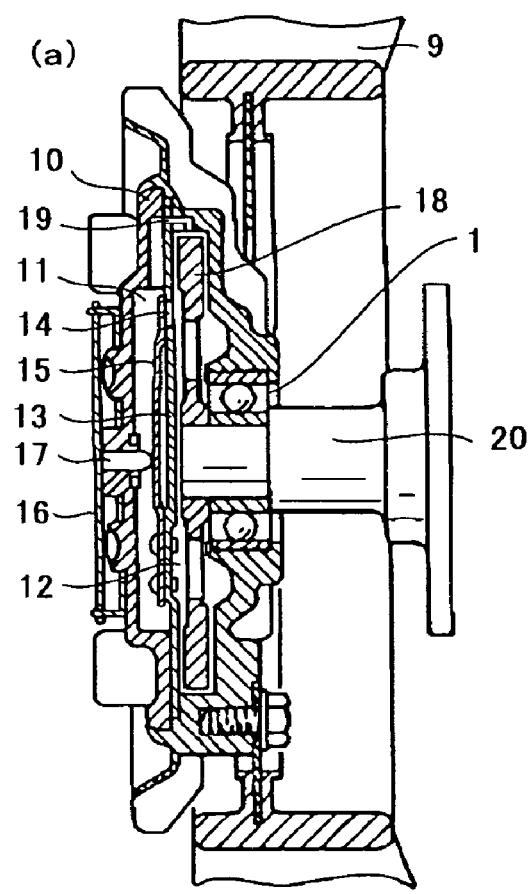
FIG. 3 is a sectional view showing the construction of a fan-coupling apparatus.
Figure 3:
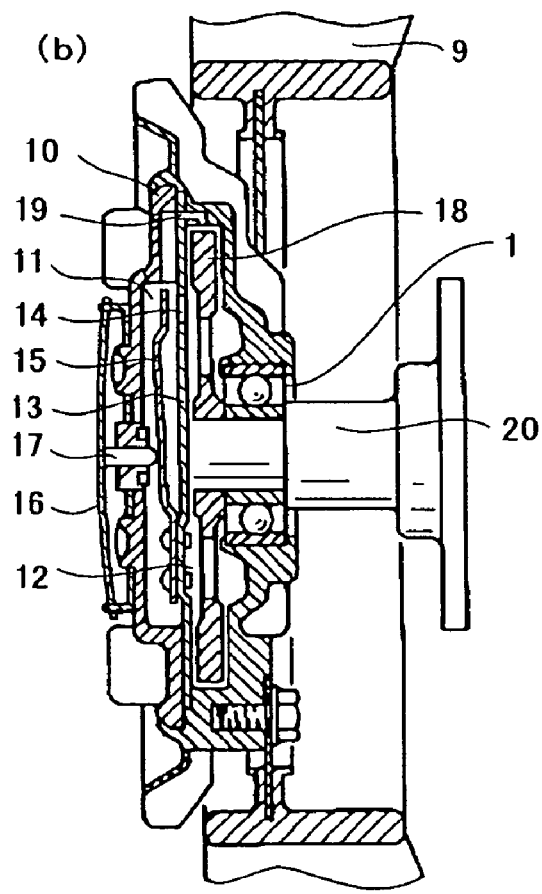

FIG. 3 shows an example of electric parts and auxiliary machines of a vehicle. FIG. 3 is a sectional view showing the construction of a fan-coupling apparatus. In the fan-coupling apparatus, inside a casing 10 supporting a cooling fan 9, there are provided an oil chamber 11 in which a viscous fluid such as silicone oil is filled and a stirring chamber 12 in which a drive disk 18 is incorporated. A port 14 is formed on a partitioning plate 13 interposed between both chambers 11 and 12. An end of a spring 15 for opening and closing the port 14 is fixed to the partitioning plate 13.

A bimetal 16 is mounted on a front surface of the casing 10. A piston 17 of the spring 15 is provided on the bimetal 16. When the temperature of air that has passed through a radiator is not more than a set temperature, for example, 60° C., the bimetal 16 becomes flat. As a result, the piston 17 presses the spring 15, and the spring 15 closes the port 14. When the temperature of the air exceeds the set temperature, as shown in FIG. 3B, the bimetal 16 is curved outward. As a result, the piston 17 does not press the spring 15. Thus the spring 15 deforms elastically and opens the port 14.

Supposing that the temperature of the air that has passed through the radiator is lower than the set temperature of the bimetal 16 when the fan-coupling apparatus having the above-described construction is operated, the viscous fluid inside the oil chamber 11 does not flow into the stirring chamber 12, because the port 14 is closed with the spring 15. At this time, the viscous fluid inside the stirring chamber 12 is fed from a circulation hole 19 formed on the partitioning plate 13 into the oil chamber 11 owing to a rotation of the drive disk 18.

Therefore the amount of the viscous fluid inside the stirring chamber 12 becomes slight. Because a shear resistance of the viscous fluid generated owing to the rotation of the drive disk 18 becomes small, a transmission torque to the casing 10 decreases. Thus the fan 9 rotates at a low speed.

When the temperature of the air that has passed through the radiator exceeds the set temperature of the bimetal 16, as shown in FIG. 3B, the bimetal 16 is curved outward, and the piston 17 does not press the spring 15. At this time, because the spring 15 deforms elastically in a direction in which the spring 15 moves away from the partitioning plate 13, the spring 15 opens the port 14. Thereby the viscous fluid inside the oil chamber 11 flows into the stirring chamber 12 from the port 14.

Therefore the shear resistance of the viscous fluid generated owing to the rotation of the drive disk 18 becomes large. Thus a rotational torque to the casing 10 increases. Thus the fan 9 supported by the rolling bearing rotates at a high speed.

Since in the fan-coupling apparatus, the rotational speed of the fan 9 changes in dependence on the change of temperature, warming-up is made fast, and over-cooling of cooling water is prevented. Thus the engine can be effectively cooled. When the temperature of the engine is low, the fan 9 is placed in a state in which the fan 9 is cut off from a drive shaft 20. On the other hand, when the temperature of the engine is high, the fan 9 is placed in a state in which the fan 9 is connected to a drive shaft 20. Therefore a rolling bearing for use in the fan-coupling apparatus is demanded to have a speed change in the range from 1000 rpm to 10000 rpm in dependence on a fluctuation of the temperature of the engine. The rolling bearing is also demanded to have high heat resistance, grease-sealing performance, and durability so that the rolling bearing withstands very severe environment in which the engine is driven in summer at a high speed not less than 10000 rpm at a high temperature not less than 180° C. In the grease-sealed rolling bearing of the present invention, it is possible to prevent its rolling surface from flaking in an early stage. Therefore the fan-coupling apparatus has excellent durability.

Figure 4:
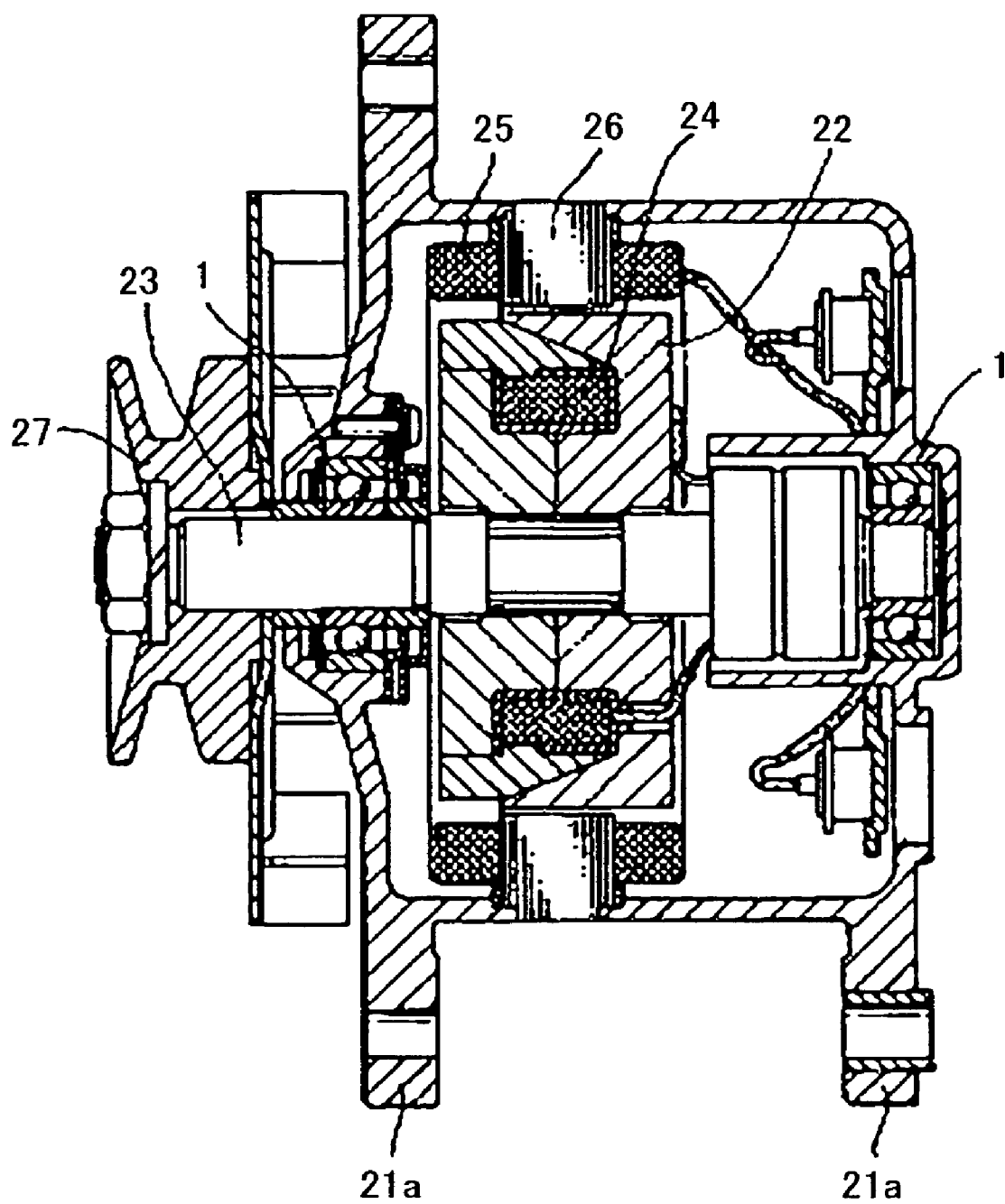
FIG. 4 is a sectional view showing the construction of an alternator.

FIG. 4 shows an example of an alternator which is electric parts and auxiliary machines of a vehicle. FIG. 4 is a sectional view showing the construction of the alternator. Through a pair of ball bearing 1, a rotating shaft 23 on which a rotor 22 is mounted is rotatably supported on a pair of frames 21a and 21b which are stationary members and form a housing. A rotor coil 24 is mounted on the rotor 22. A stator coil 26 of three rolls is mounted at a phase of 120 degrees on a stator 25 disposed on the periphery of the rotor 22.

A rotational shaft 23 of the rotor 22 is driven by a rotational torque transmitted to a pulley 27 mounted on the front end thereof through a belt (not shown in FIG. 4). The pulley 27 is mounted on the rotational shaft 23 in a cantilevered state. Vibrations are generated when the rotational shaft 23 rotates at a high speed. Thus a ball bearing 1 supporting the pulley 27 is subjected to a high load. For example, the ball bearing 1 is demanded to have high heat resistance, grease-sealing performance, and durability so that the ball bearing 1 withstands very severe environment in which the rotational shaft 23 is driven at a high speed not less than 10000 rpm at a high temperature not less than 150° C. In the grease-sealed rolling bearing of the present invention, it is possible to prevent its rolling surface from flaking in an early stage. Therefore the alternator for the vehicle has an excellent durability.

Figure 5:
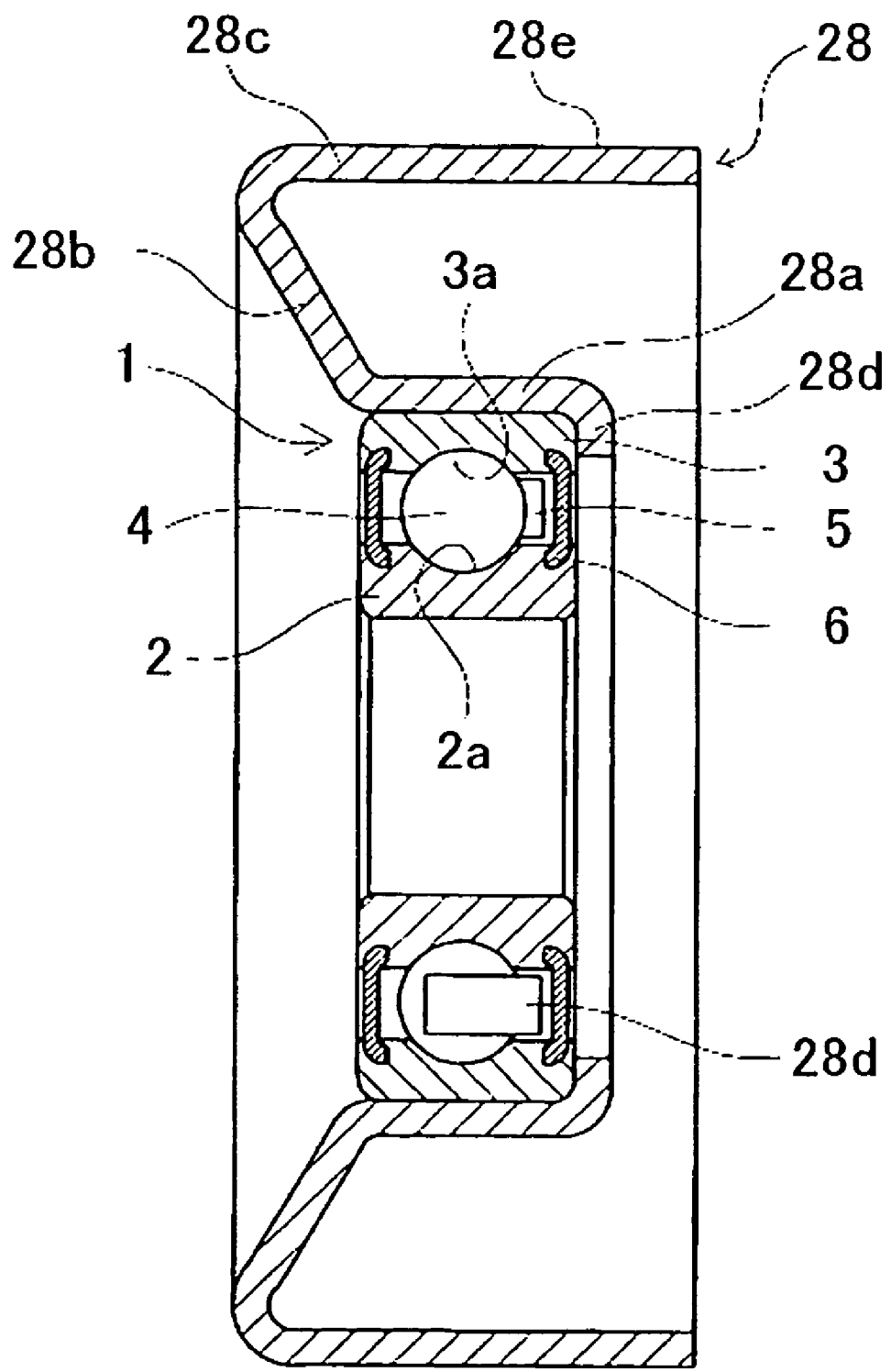
FIG. 5 is a sectional view showing the construction of an idler pulley.

FIG. 5 shows an example of an idler pulley which is used as a part for tensioning a belt for driving an auxiliary machine of a vehicle. FIG. 5 is a sectional view showing the construction of the idler pulley.

The pulley has a body 28 made of a steel plate press and deep groove ball bearings 1, arranged in one row, fitted on the inner periphery of the body 28. The body 28 is an annular body constructed of an inner cylindrical part 28a, a flange part 28b extending from one end of the inner cylindrical part 28a to the periphery of the body 28, an outer cylindrical part 28c extending axially from the flange part 28b, and a collar 28d extending from the other end of the inner cylindrical part 28a to the inner periphery of the body 28. An outer ring 3 of the ball bearing 1 is fitted on the inner periphery of the inner cylindrical part 28a. A peripheral surface 28e that contacts a belt driven by an engine is provided on the periphery of the outer cylindrical part 28c. The peripheral surface 28e is brought into contact with the belt so that the pulley serves as an idler.

The ball bearing 1 has the outer ring 3 fitted on the inner periphery of the inner cylindrical part 28a of the body 28, an inner ring 2 fitted on an unshown fixed shaft, a plurality of rollers 4 disposed between a transfer surface 2a of the inner ring 2 and a transfer surface 3a of the outer ring 3, a holder 5 for holding the rollers 4 circumferentially at regular intervals, and a pair of sealing members 6 sealing the lubricant composition. The inner ring 2 and the outer ring 3 are formed integrally.

The rolling bearing for use in the idler pulley is demanded to have high heat resistance, grease-sealing performance, and durability so that the rolling bearing withstands very severe environment in which a rotational shaft is driven at a high speed not less than 10000 rpm at a high temperature not less than 150° C. In the grease-sealed rolling bearing of the present invention, it is possible to prevent its rolling surface from flaking in an early stage. Therefore the idler pulley for the vehicle has excellent durability.

window motor. Thus rolling bearings for motors have sliding to a higher extent. As the use conditions of the motors have become severe, the peculiar flaking phenomenon occurs in an early stage with the rolling surface of the bearing turning into white in its texture. Therefore the rolling bearing for use in the motor is demanded to be driven stably for a long time and have reliability. In the grease-sealed rolling bearing of the present invention, it is possible to prevent its rolling surface from flaking in an early stage. Therefore it is possible to obtain a motor having excellent durability.

Examples 1 Through 7 and Comparison Examples 1 Through 5

A needle roller bearing (outer diameter of inner ring: φ 24 mm, inner diameter of outer ring: φ 32 mm, width: 20 mm, roller: φ 4×16.8 mm×14 pieces) was lubricated with the lubricant composition having the composition shown in table 1 to conduct a life test.

In the life test, the bearing was rotated by changing speeds sequentially in the order of 3000 rpm, 500 rpm, 3000 rpm, and 500 rpm. The radial load applied to the bearing was 6.76 kN. The bearing was heated to 100° C. The time when the rolling surface flaked (flaking-generated time) was measured. Table 1 shows the results.

TABLE 1

| | Example | | | | | | | Comparison example | | | | |
|---|---|---|---|---|---|---|---|---|---|---|---|---|
| | 1 | 2 | 3 | 4 | 5 | 6 | 7 | 1 | 2 | 3 | 4 | 5 |
| Component (parts by weight) | | | | | | | | | | | | |
| Water-glycol hydraulic oil*[1] | 99.0 | 99.7 | 99.5 | 99.0 | 98.5 | 99.5 | — | 100.0 | — | 85.0 | 99.0 | 99.0 |
| Mineral oil*[2] | — | — | — | — | — | — | 89.5 | — | 90.0 | — | — | — |
| $H_2O$ | — | — | — | — | — | — | 10.0 | — | 10.0 | — | — | — |
| $Na_2MoO_4$ | 1.0 | — | — | — | — | — | — | — | — | 15.0 | — | — |
| $K_2MoO_4$ | — | 0.3 | 0.5 | 1.0 | 1.5 | — | 0.5 | — | — | — | — | — |
| $Li_2MoO_4$ | — | — | — | — | — | 0.5 | — | — | — | — | — | — |
| $Na_2WO_4$ | — | — | — | — | — | — | — | — | — | — | 1.0 | — |
| $Na_3PO_4$ | — | — | — | — | — | — | — | — | — | — | — | 1.0 |
| Properties | | | | | | | | | | | | |
| Flaking-generated time, hr | 58.5 | 71.0 | 93.0 | 152.5 | 75.4 | 52.3 | >300*[3] | 12.7 | 84.2 | 34.6*[4] | 17.0 | 13.5 |

*[1] Water:glycol = 40:60, kinematic viscosity at 40° C.: 32 $mm^2/s$
*[2] Paraffin oil, kinematic viscosity at 40° C.: 30.7 $mm^2/s$
*[3] 300 hours, suspended (Peeling was not recognized after test finished.)
*[4] Flaking is caused not by hydrogen embrittlement but by metal fatigue started from surface of bearing.

Figure 6:
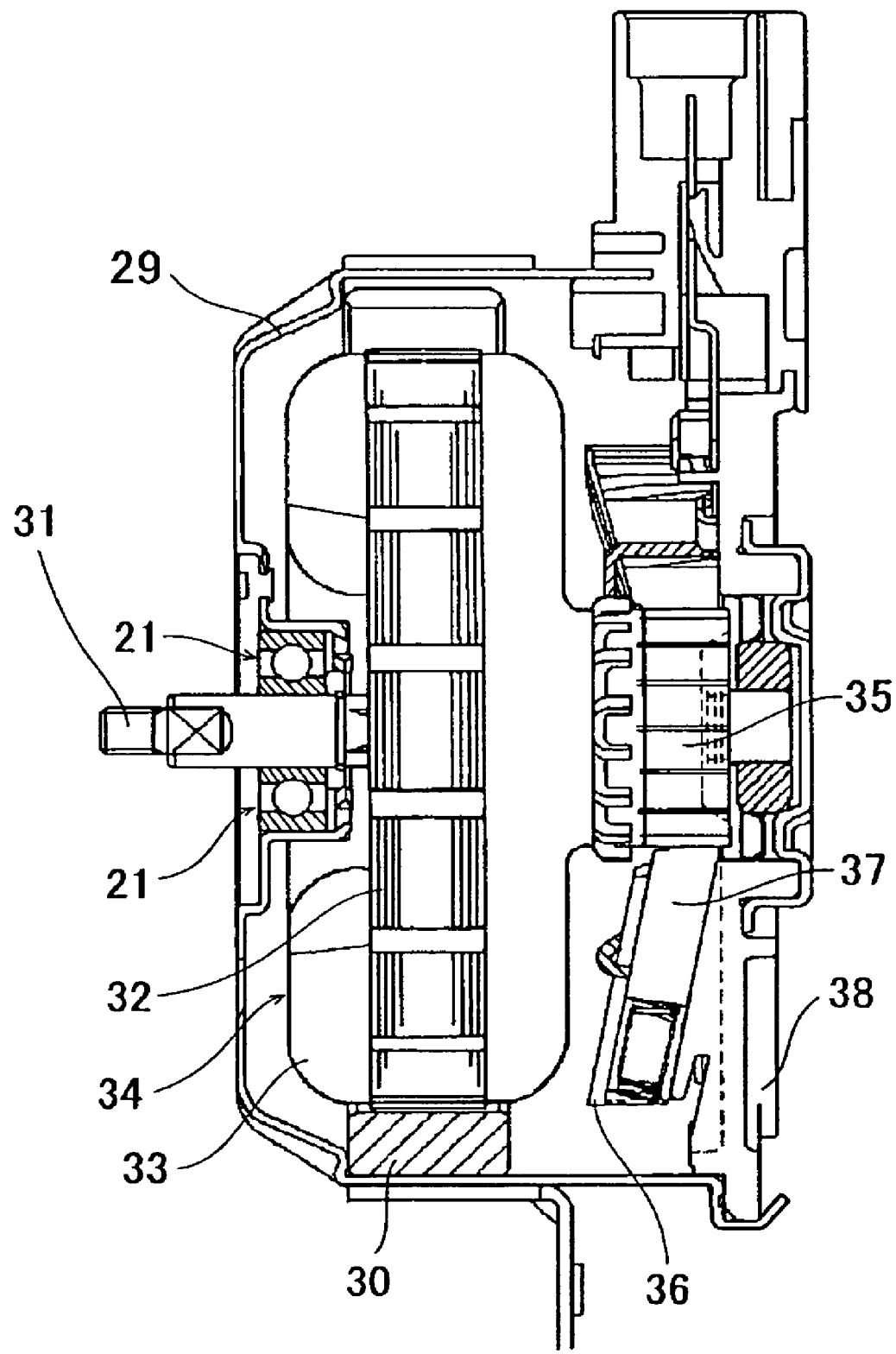
FIG. 6 is a sectional view showing the construction of a motor.

FIG. 6 shows an example of a motor. FIG. 6 is a sectional view showing the construction of the motor. The motor has a stator 30 consisting of a magnet, for the motor, disposed on the inner peripheral wall of a jacket 29, a rotor 34 on which a coil 33 fixed to a rotating shaft 31 is wound, a commutator 35 fixed to the rotating shaft 31, a brush holder 36 disposed on an end frame 38 supported by the jacket 29, and a brush 37 accommodated inside the brush holder 36. The rotating shaft 31 is rotatably supported on the jacket 29 by a ball bearing 1 and a supporting construction for the bearing 1.

General-purpose motors such as an AC motor, a DC motor, and the like have become smaller. Hence there is a tendency that the bearing is driven under a high surface pressure. The following motors are subjected to frequent repetition of start—sudden acceleration operation—high-speed operation—sudden deceleration operation—sudden stop: electric motors such as a servo motor for industrial machines; and motors for electric apparatuses such as a starter motor for a vehicle, an electromotive power steering motor, a steering-adjusting tilt motor, a blower motor, a wiper motor, a power After the life test finished, a color change occurred on the rolling surface of the bearing of the examples 1 through 7. On the other hand, after the life test finished, no color change occurred on the rolling surface of the bearing of the comparison examples 1 through 5. Considering that the color change of the rolling surface restrained the peculiar flaking caused by the hydrogen embrittlement, the composition of the color-changed portion (generated film) was analyzed. As a result of the analysis of the composition of the film generated on the rolling surface by means of XPS (ESCA), Mo was detected in addition to Fe, O, and C. A close examination of the detected Mo revealed that the generated film consisted of a composite film containing the molybdenum oxide.

As apparent from the result of the analysis, it was found that the molybdate had decomposition and reaction on a worn surface of the bearing or on a fresh surface of an iron-based metal generated by wear to form the film containing the molybdenum compound in addition to the iron oxide film on the rolling surface of the bearing. The film formed in this manner prevented the penetration of hydrogen generated owing to the decomposition of the lubricant composition into the bearing steel, thus restraining the generation of the flaking. Consequently it was confirmed that the life characteristic of the bearing of each of the examples evaluated in terms of the flaking generation time could be improved.

Examples 8 Through 16 and Comparison Examples 6 Through 12

A needle roller bearing (outer diameter of inner ring: φ 24 mm, inner diameter of outer ring: φ 32 mm, width: 20 mm, roller: φ 4×16.8 mm×14 pieces) was lubricated with the lubricant composition having the composition shown in tables 2 and 3 to conduct a life test.

In the life test, the bearing was rotated by changing speeds sequentially in the order of 3000 rpm, 500 rpm, 3000 rpm, and 500 rpm. The radial load applied to the bearing was 6.76 kN. The bearing was heated to 100° C. The time when the rolling surface flaked (flaking-generated time) was measured. To measure the flaking-generated time, when a frequency detected by a vibration detector exceeded the predetermined value, a tester was stopped. Thereafter the generated flaking was visually checked. Tables 2 and 3 show the results.

TABLE 2

| | Example | | | | | | | | |
|---|---|---|---|---|---|---|---|---|---|
| | 8 | 9 | 10 | 11 | 12 | 13 | 14 | 15 | 16 |
| Component (parts by weight) | | | | | | | | | |
| Water-glycol hydraulic oil[1] | 98.9 | 99.4 | 99.3 | 99.45 | 98.9 | 99.4 | 98.9 | 98.9 | — |
| Mineral oil[2] | — | — | — | — | — | — | — | — | 88.9 |
| $H_2O$ | — | — | — | — | — | — | 10.0 | — | 10.0 |
| $Na_2MoO_4$ | 1.0 | — | — | — | — | — | — | — | — |
| $K_2MoO_4$ | — | 0.5 | 0.5 | 0.5 | 1.0 | — | 1.0 | 1.0 | 1.0 |
| $Li_2MoO_4$ | — | — | — | — | — | 0.5 | — | — | — |
| Sodium benzoate | 0.1 | 0.1 | 0.2 | 0.05 | 0.1 | 0.1 | — | — | 0.1 |
| Sodium sebacate | — | — | — | — | — | — | 0.1 | — | — |
| Sodium succinate | — | — | — | — | — | — | — | 0.1 | — |
| Properties | | | | | | | | | |
| Flaking-generated time, hr | 90.5 | 144.6 | 140.5 | 124.8 | 206.8 | 115.4 | 171.6 | 168.9 | >300[3] |

[1] Water:glycol = 40:60, kinematic viscosity at 40° C.: 32 $mm^2$/s
[2] Paraffin oil, kinematic viscosity at 40° C.: 30.7 $mm^2$/s
[3] 300 hours, suspended (Flaking was not recognized after test finished.)

TABLE 3

| | Comparison example | | | | | | |
|---|---|---|---|---|---|---|---|
| | 6 | 7 | 8 | 9 | 10 | 11 | 12 |
| Component (parts by weight) | | | | | | | |
| Water-glycol hydraulic oil[1] | 100.0 | — | 99.0 | 99.5 | 99.0 | 99.0 | 98.0 |
| Mineral oil[2] | — | 90 | — | — | — | — | — |
| $H_2O$ | — | 10 | — | — | — | — | — |
| $Na_2MoO_4$ | — | — | 1.0 | — | — | — | — |
| $K_2MoO_4$ | — | — | — | — | — | — | 1.0 |
| $Li_2MoO_4$ | — | — | — | 0.5 | — | — | — |
| Sodium benzoate | — | — | — | — | 1.0 | — | 1.0 |
| Sodium sebacate | — | — | — | — | — | 1.0 | — |
| Sodium succinate | — | — | — | — | — | — | — |
| Properties | | | | | | | |
| Flaking-generated time, hr | 12.5 | 84.2 | 58.5 | 52.3 | 26.7 | 22.3 | 40.8 |

[1] Water:glycol = 40:60, kinematic viscosity at 40° C.: 32 $mm^2$/s
[2] Paraffin oil, kinematic viscosity at 40° C.: 30.7 $mm^2$/s
[3] 300 hours, suspended (Flaking was not recognized after test finished.)

After the life test finished, a color change occurred on the rolling surface of the bearing of the examples 8 through 16. On the other hand, after the life test finished, no color change occurred on the rolling surface of the bearing of the comparison examples 6 through 12. Considering that the color change of the rolling surface restrained the peculiar flaking caused by the hydrogen embrittlement, the composition of the color-changed portion (generated film) was analyzed. As a result of the analysis of the composition of the film generated on the rolling surface by means of XPS (ESCA), Mo was detected in addition to Fe, O, and C. A close examination of the detected Mo revealed that the generated film consisted of a composite film containing the molybdenum oxide.

As apparent from the result of the analysis, the molybdate had decomposition and reaction on a worn surface of the bearing or on a fresh surface of an iron-based metal generated by wear to form the film containing the molybdenum compound in addition to the iron oxide film on the rolling surface of the bearing. The film formed in this manner prevented the penetration of hydrogen generated owing to the decomposition of the lubricant composition into the bearing steel, thus restraining hydrogen embrittlement-caused flaking. Consequently it was confirmed that the life characteristic of the bearing of each of the examples evaluated in terms of the flaking generation time could be improved.

Examples 17 Through 21 and Comparison Examples 13 Through 15

The same life test as that conducted in the example 8 was done except that the lubricating oil having the composition shown in table 4 was used instead of the lubricating oil having the composition shown in tables 2 and 3. Table 4 shows the results.

TABLE 4

|  | Example | | | | | Comparison example | | |
| --- | --- | --- | --- | --- | --- | --- | --- | --- |
|  | 17 | 18 | 19 | 20 | 21 | 13 | 14 | 15 |
| Component (parts by weight) | | | | | | | | |
| Water-glycol hydraulic oil*[1] | 99.0 | 99.5 | 99.8 | — | — | 100 | — | 92.0 |
| Mineral oil*[2] | — | — | — | 89.5 | 89.7 | — | 90 | — |
| $H_2O$ | — | — | — | 10 | 10 | — | 10 | — |
| $K_2MnO_4$ | 1.0 | 0.5 | 0.2 | 0.5 | 0.3 | — | — | 8.0 |
| Properties | | | | | | | | |
| Flaking-generated time, hr | 135.6 | 112.3 | 85 | >300[3] | >300[3] | 12.5 | 84.2 | 58.5[4] |

*[1] Water:glycol = 40:60, kinematic viscosity at 40° C.: 32 $mm^2/s$
*[2] Paraffin oil, kinematic viscosity at 40° C.: 30.7 $mm^2/s$
*[3] 300 hours, suspended (Peeling was not recognized after test finished.)
*[4] Flaking is caused not by hydrogen embrittlement but by metal fatigue started from surface of bearing.

As shown in table 4, the life characteristic of the bearing of each of the examples evaluated in terms of the flaking generation time could be improved.

Examples 22 Through 34

Grease was prepared by the following method: 4,4-diphenylmethane diisocyanate (MDI) was dissolved in the half amount of the base oil shown in tables 5 and 6 at the ratios shown in tables 5 and 6. Monoamine which was twice as large as that of the 4,4-diphenylmethane diisocyanate in the equivalent weight thereof was dissolved in the remaining half amount of the base oil. The mixing ratio and kind of the components of the lubricant composition of each of the examples are as shown in tables 5 and 6.

A solution in which the monoamine was dissolved was added to a solution in which the 4,4-diphenylmethane diisocyanate was dissolved, while the solution in which the 4,4-diphenylmethane diisocyanate was dissolved was being stirred. Thereafter the mixed solution was kept stirred at 100 to 120° C. for 30 minutes to allow reaction between the 4,4-diphenylmethane diisocyanate and the monoamine. Thereby a diurea compound was produced in the base oil.

The molybdate, the organic acid salt, and the antioxidant were added to the diurea compound at the mixing ratios shown in tables 5 and 6. The mixture was stirred at 100 to 120° C. for 10 minutes. Thereafter the mixture was cooled and homogenized by a three-roll mill to obtain grease.

In tables 5 and 6, the alkyldiphenyl ether oil used as the base oil was LB100 (trade name) produced by Matsumura Sekiyu Inc. Shinfluid 601 (trade name) produced by Nippon Steel Chemical Co., Ltd.) was used as the hydrocarbon synthetic oil. Kaolube 268 (trade name) produced by Kao Corp. was used as the polyol ester. As the mineral oil, paraffin mineral oil having a kinematic viscosity of 30.7 $mm^2/s$ at 40° C. was used.

As the antioxidant, alkylated diphenylamine was used.

A high-temperature high-speed test, a quick acceleration-deceleration test, and the measurement of mixing consistency in accordance with JIS were conducted on each grease. The method carried out in the tests and the test conditions are shown below. Tables 5 and 6 show the results.

High-Temperature High-Speed Test 1.8 g of grease obtained in the examples 22 through 36 and the comparison examples 16 through 21 was sealed in the rolling bearing (6204). The rolling bearing was rotated at 10000 rpm in the condition of 180° C. at the outer end of the outer ring thereof, a radial load of 67N, and an axial load of 67N to measure the time when seizure occurred.

Quick Acceleration-Deceleration Test

A quick acceleration-deceleration test was conducted on the rolling bearing, whose inner ring rotates, supporting the rotational shaft of an alternator which is an example of electric parts and auxiliary machines. Grease obtained in the examples 22 through 36 and the comparison examples 16 through 21 was applied to the rolling bearing. As the test condition, a load of 3234N was applied to a pulley mounted on the front end of the rotational shaft, and the rotational shaft was rotated at 0 to 18000 rpm. To measure the time when the flaking occurred on the rolling surface of the bearing, when a frequency detected by a vibration detector exceeded the predetermined value, a generator was stopped.

Examples 35 and 36

Li-12-hidroxy stearate was dissolved in the base oil shown in table 6 by heating the solution to 200° C. while it was being stirred. The mixing ratio of each component is as shown in table 6. After the solution was cooled, the molybdate, the organic acid salt, and the antioxidant were added thereto at the mixing ratio shown in table 6. The mixture was homogenized by a three-roll mill to obtain grease. The high-temperature high-speed test and the quick acceleration-deceleration test were conducted on each grease. In consideration of the heat resistance of Li soap, the high-temperature high-speed test was conducted at 150° C.

Comparison Examples 16 Through 21

Base grease was prepared in a method in accordance with the method carried out in the example 22 by selecting the thickner and the base oil at the mixing ratio shown in table 6. Additives were also added to the base oil. The obtained grease was evaluated by conducting the high-temperature high-speed test and the quick acceleration-deceleration test. Table 6 shows the results.

TABLE 5

| | Example | | | | | | | | | | |
|---|---|---|---|---|---|---|---|---|---|---|---|
| | 22 | 23 | 24 | 25 | 26 | 27 | 28 | 29 | 30 | 31 | 32 |
| Component (parts by weight) | | | | | | | | | | | |
| Base oil | | | | | | | | | | | |
| Alkyldiphenyl ether oil | 80 | 60 | 60 | — | — | 87 | — | 60 | 60 | 60 | 60 |
| Synthesized hydrocarbon oil | — | 20 | — | — | — | — | 87 | 20 | 20 | 20 | 20 |
| Polyester oil | — | — | 20 | — | 85 | — | — | — | — | — | — |
| Mineral oil | — | — | — | 87 | — | — | — | — | — | — | — |
| Thickener | | | | | | | | | | | |
| Amine, p-toluidine | 9.3 | 9.3 | 9.3 | — | — | — | — | 9.3 | 9.3 | 9.3 | 9.3 |
| Amine, cyclohexylamine | — | — | — | — | 6.6 | — | — | — | — | — | — |
| Amine, octylamine | — | — | — | 6.6 | — | 6.6 | 6.6 | — | — | — | — |
| Diisocyanate, MDI | 10.7 | 10.7 | 10.7 | 6.4 | 8.3 | 6.4 | 6.4 | 10.7 | 10.7 | 10.7 | 10.7 |
| Li-12-hydroxystearate | — | — | — | — | — | — | — | — | — | — | — |
| Additives | | | | | | | | | | | |
| Molybdate | | | | | | | | | | | |
| $Na_2MoO_4$ | — | — | — | — | — | — | — | — | — | 1 | — |
| $K_2MoO_4$ | 2 | 2 | 2 | 2 | 2 | 2 | 2 | 3 | 0.5 | — | — |
| $Li_2MoO_4$ | — | — | — | — | — | — | — | — | — | — | 1 |
| Organic acid salt | | | | | | | | | | | |
| Sodium benzoate | 0.2 | 0.2 | 0.2 | 0.2 | 0.2 | 0.2 | 0.2 | 0.3 | 0.1 | 0.1 | 0.1 |
| Sodium sebacate | — | — | — | — | — | — | — | — | — | — | — |
| Sodium succinate | — | — | — | — | — | — | — | — | — | — | — |
| Antioxidant | 2 | 2 | 2 | 2 | 2 | 2 | 2 | 2 | 2 | 2 | 2 |
| Properties | | | | | | | | | | | |
| Worked penetration (JIS K2220) | 285 | 288 | 292 | 285 | 290 | 280 | 295 | 280 | 295 | 285 | 289 |
| High-temperature(180° C.) high-speed test, h | 870 | 730 | 780 | 350 | 510 | 950 | 480 | 810 | 690 | 770 | 740 |
| High-temperature(150° C.) high-speed test, h | — | — | — | — | — | — | — | — | — | — | — |
| Quick acceleration-deceleration test, hr | >300 | >300 | >300 | >300 | >300 | >300 | >300 | >300 | >300 | >300 | >300 |

TABLE 6

| | Example | | | | Comparison example | | | | | |
|---|---|---|---|---|---|---|---|---|---|---|
| | 33 | 34 | 35 | 36 | 16 | 17 | 18 | 19 | 20 | 21 |
| Component (parts by weight) | | | | | | | | | | |
| Base oil | | | | | | | | | | |
| Alkyldiphenyl ether oil | 60 | 60 | — | — | 60 | 60 | — | — | — | — |
| Synthesized hydrocarbon oil | 20 | 20 | — | — | 20 | 20 | — | 87 | — | — |
| Polyester oil | — | — | 90 | — | — | — | 85 | — | — | 90 |
| Mineral oil | — | — | — | 90 | — | — | — | — | 87 | — |
| Thickener | | | | | | | | | | |
| Amine, p-toluidine | 9.3 | 9.3 | — | — | 9.3 | 9.3 | — | — | — | — |
| Amine, cyclohexylamine | — | — | — | — | — | — | 6.6 | — | — | — |
| Amine, octylamine | — | — | — | — | — | — | — | 6.6 | 6.6 | — |
| Diisocyanate, MDI | 10.7 | 10.7 | — | — | 10.7 | 10.7 | 8.3 | 6.4 | 6.4 | — |
| Li-12-hydroxystearate | — | — | 10 | 10 | — | — | — | — | — | 10 |
| Additives | | | | | | | | | | |
| Molybdate | | | | | | | | | | |
| $Na_2MoO_4$ | — | — | — | — | — | — | — | — | — | — |
| $K_2MoO_4$ | 1 | 1 | 3 | 3 | — | 2 | — | — | — | — |
| $Li_2MoO_4$ | — | — | — | — | — | — | — | — | — | — |
| Organic acid salt | | | | | | | | | | |
| Sodium benzoate | — | — | 0.3 | 0.3 | — | — | — | — | — | — |
| Sodium sebacate | 0.1 | — | — | — | — | — | — | — | — | — |
| Sodium succinate | — | 0.1 | — | — | — | — | — | — | — | — |
| Antioxidant | 2 | 2 | 2 | 2 | 2 | 2 | 2 | 2 | 2 | 2 |
| Properties | | | | | | | | | | |
| Worked penetration (JIS K2220) | 292 | 288 | 280 | 295 | 290 | 288 | 280 | 293 | 294 | 285 |
| High-temperature(180° C.) high-speed test, h | 830 | 750 | — | — | 420 | 445 | 230 | 900 | 180 | — |
| High-temperature(150° C.) high-speed test, h | — | — | 1500 | 330 | — | — | — | — | — | 90 |
| Quick acceleration-deceleration test, hr | >300 | >300 | >300 | >300 | 67 | 146 | 26 | 43 | 55 | 51 |

As shown in tables 5 and 6, the grease of each of the examples 22 through 36 is capable of effectively preventing the peculiar flaking phenomenon from occurring on the rolling surface of the bearing with the rolling surface of the bearing turning into white in its texture. Therefore the grease showed satisfactory results in the high-temperature high-speed test and the quick acceleration-deceleration test. Not less than 300 hours were shown by the rolling bearing in the quick acceleration-deceleration test. The rolling bearing in which the grease of the present invention was sealed had the rotating inner ring and supported the rotational shaft of the alternator which is an example of electric parts and auxiliary machines. The bearing in which the grease of the present invention was sealed, the bearing for use in electric parts and auxiliary machines of a vehicle, and the bearing, for a motor, in which the grease of the present invention is sealed show satisfactory results in the high-temperature high-speed test and the quick acceleration-deceleration test.

The lubricating oil of the present invention contains the molybdate essentially and the organic acid salt or the permanganate. Therefore, the lubricating oil is capable of effectively preventing the rolling surface of the bearing from flaking owing to the hydrogen embrittlement. The molybdate is the metal salt of the molybdic acid. The molybdate is the alkali metal salt of the molybdic acid. Therefore the lubricating oil of the present invention containing the water-based lubricating oil used as the base oil thereof is capable of effectively preventing the rolling surface of the bearing from flaking owing to the hydrogen embrittlement. Accordingly the lubricating oil can be utilized for a bearing to be lubricated with gear oil and hydraulic oil. Particularly the lubricating oil of the present invention containing the water-based lubricating oil used as the base oil thereof is capable of effectively preventing the rolling surface of the bearing from flaking owing to the hydrogen embrittlement.

The grease of the present invention contains the base oil and the thickner both added to the molybdate and the organic acid salt. Therefore in bearings for use in vehicles and industrial machines, the grease of the present invention is capable of preventing the rolling surface thereof from peculiar flaking owing to the hydrogen embrittlement. Consequently the grease is capable of prolonging the lives of bearings for use in electric parts and auxiliary machines of vehicles such as an alternator, an electromagnetic clutch for an air conditioner, an idler pulley, an electromotive fan motor, and the like.

What is claimed is:

1. A lubricant composition for a bearing, wherein said lubricant composition is a lubricating oil consisting of a water-based lubricating oil and a permanganate or consisting of a mineral oil, water and a permanganate.

2. A lubricant composition according to claim 1, wherein said permanganate is potassium permanganate.

3. A lubricant composition according to claim 1, wherein 0.01 wt % to 5 wt % of said permanganate is added to the entirety of said lubricant composition.

4. A lubricant composition for a bearing that is a lubricating oil consisting of a metal salt of molybdic acid, a base oil which is a water-glycol hydraulic oil or a mineral oil with water, and optionally an organic acid salt,
    wherein said organic acid salt is a sodium salt of an organic acid having 1 to 20 carbon atoms,
    wherein said metal salt of molybdic acid is represented by $M_2MoO_4$, wherein M denotes any one of Na, K and Li.

5. A lubricant composition for a bearing, capable of restraining flaking owing to hydrogen embrittlement, that is a lubricating oil consisting of a metal salt of molybdic acid, a base oil which is a water-glycol hydraulic oil or a mineral oil with water, and optionally an organic acid salt,
    wherein said organic acid salt is a sodium salt of an organic acid having 1 to 20 carbon atoms,
    wherein said metal salt of molybdic acid is represented by $M_2MoO_4$, wherein M denotes any one of Na, K and Li,
    wherein said metal salt of molybdic acid of said lubricant composition can form a film containing a molybdenum compound in addition to an iron oxide film on a worn surface of said bearing or on a generated fresh surface of an iron-based metal by wear.

6. A lubricant composition according to claim 4, wherein said base oil of said lubrication oil is a water-glycol hydraulic oil.

7. A lubricant composition according to claim 5, wherein said base oil of said lubrication oil is a water-glycol hydraulic oil.

8. A lubricant composition according to claim 4, being free from said organic acid salt, wherein 0.01 wt % to 10 wt % of said metal salt of molybdic acid is added to the entirety of said lubricant composition.

* * * * *